(12) United States Patent
Matsuo et al.

(10) Patent No.: US 11,694,490 B2
(45) Date of Patent: Jul. 4, 2023

(54) DIAGNOSTIC APPARATUS FOR VEHICLE

(71) Applicant: TOYOTA JIDOSHA KABUSHIKI KAISHA, Toyota (JP)

(72) Inventors: Kenji Matsuo, Toyota (JP); Yuji Hattori, Ichinomiya (JP); Akihide Itoh, Nagoya (JP); Hideaki Bunazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 17/135,537

(22) Filed: Dec. 28, 2020

(65) Prior Publication Data

US 2021/0217257 A1 Jul. 15, 2021

(30) Foreign Application Priority Data

Jan. 9, 2020 (JP) .................................. 2020-002451

(51) Int. Cl.
*F16H 61/12* (2010.01)
*G07C 5/08* (2006.01)
*F16H 61/662* (2006.01)

(52) U.S. Cl.
CPC .......... *G07C 5/0808* (2013.01); *F16H 61/12* (2013.01); *F16H 61/662* (2013.01); *G07C 5/0816* (2013.01); *F16H 2061/1208* (2013.01)

(58) Field of Classification Search
CPC ................... F16H 61/12; F16H 61/662; F16H 2061/1208; F16H 2061/6629
See application file for complete search history.

(56) References Cited

U.S. PATENT DOCUMENTS

| 2014/0200112 A1* | 7/2014 | Tokura | ................ B60W 10/06 477/37 |
| 2018/0010687 A1* | 1/2018 | Moritomo | ............. F16H 37/022 |
| 2018/0252315 A1* | 9/2018 | Rippelmeyer | .... F16H 61/66272 |

FOREIGN PATENT DOCUMENTS

| JP | 2003-329126 A | 11/2003 |
| JP | 2004-100826 A | 4/2004 |
| JP | 2016-161046 A | 9/2016 |

* cited by examiner

*Primary Examiner* — Edwin A Young
(74) *Attorney, Agent, or Firm* — Oliff PLC

(57) ABSTRACT

A diagnostic apparatus for a vehicle provided with a continuously-variable transmission including a primary pulley, a secondary pulley and a belt looped over the primary and secondary pulleys, such that each of the primary and secondary pulleys includes a hydraulic actuator to which a working fluid is to be supplied. The diagnostic apparatus is configured, in event of occurrence of slippage of the belt on at least one of the primary and secondary pulleys, to infer a factor causing the slippage of the belt, based on at least one of a hydraulic pressure of the working fluid supplied to the hydraulic actuator of the primary pulley and a hydraulic pressure of the working fluid supplied to the hydraulic actuator of the secondary pulley, upon the occurrence of the slippage of the belt.

7 Claims, 7 Drawing Sheets

DIAGNOSTIC APPARATUS FOR VEHICLE

This application claims priority from Japanese Patent Application No. 2020-002451 filed on Jan. 9, 2020, the disclosure of which is herein incorporated by reference in its entirety.

FIELD OF THE INVENTION

The present invention relates to a diagnostic apparatus for a vehicle that is provided with a belt-type continuously-variable transmission including a primary pulley, a secondary pulley and a belt looped over the primary and secondary pulleys.

BACKGROUND OF THE INVENTION

There is well known a belt-type continuously-variable transmission including a primary pulley, a secondary pulley and a belt looped over the primary and secondary pulleys. Such a continuously-variable transmission is disclosed in JP-2003-329126A. This Japanese Patent Application Publication discloses that, in the continuously-variable transmission including an input member (corresponding to a primary pulley described in the present specification), an output member (corresponding to a secondary pulley described in the present specification) and a transmission member (corresponding to a belt described in the present specification) looped over the input and output members, a degree of deterioration of the transmission member is detected based on a correlation between slippage of the transmission member on one of the input and output members and a drive force transmitted through the transmission member.

SUMMARY OF THE INVENTION

By the way, in the above-identified Japanese Patent Application Publication, although the degree of deterioration of the belt is detected, a factor causing the slippage of the belt is not specified, so that there is a room for improvement from a point of view of suppression of progress of the deterioration of the belt.

The present invention was made in view of the background art described above. It is therefore an object of the present invention to provide a diagnostic apparatus for a vehicle that is provided with a belt-type continuously-variable transmission including a primary pulley, a secondary pulley and a belt looped over the primary and secondary pulleys, wherein the diagnostic apparatus is capable of specifying a factor causing slippage of the belt.

The object indicated above is achieved according to the following aspects of the present invention.

According to a first aspect of the invention, there is provided a diagnostic apparatus for a vehicle that is provided with a continuously-variable transmission, wherein the continuously-variable transmission includes a primary pulley, a secondary pulley and a belt looped over the primary and secondary pulleys, such that each of the primary and secondary pulleys includes a hydraulic actuator to which a working fluid is to be supplied, and wherein the diagnostic apparatus comprises an inference portion that is configured, in event of occurrence of slippage of the belt on at least one of the primary and secondary pulleys, to infer a factor causing the slippage of the belt, based on at least one of a hydraulic pressure of the working fluid supplied to the hydraulic actuator of the primary pulley and a hydraulic pressure of the working fluid supplied to the hydraulic actuator of the secondary pulley, upon the occurrence of the slippage of the belt.

According to a second aspect of the invention, the diagnostic apparatus according to the first aspect of the invention further comprises: a slippage-number measure portion configured to measure a number of times of the occurrence of the slippage of the belt; and a hydraulic-vibration measure portion configured to determine whether a hydraulic vibration of at least one of the hydraulic pressure of the working fluid supplied to the hydraulic actuator of the primary pulley and the hydraulic pressure of the working fluid supplied to the hydraulic actuator of the secondary pulley has occurred or not, upon the occurrence of the slippage of the belt, and configured to measure a number of times of the occurrence of the hydraulic vibration, wherein the inference portion is configured to infer whether the hydraulic vibration is the factor causing the slippage of the belt, based on the number of times of the occurrence of the slippage of the belt and the number of times of the occurrence of the hydraulic vibration.

According to a third aspect of the invention, the diagnostic apparatus according to the first aspect of the invention further comprises: a slippage-number measure portion configured to measure a number of times of the occurrence of the slippage of the belt; and a response-delay measure portion configured to determine whether a response delay of at least one of the hydraulic pressure of the working fluid supplied to the hydraulic actuator of the primary pulley and the hydraulic pressure of the working fluid supplied to the hydraulic actuator of the secondary pulley has occurred or not, upon the occurrence of the slippage of the belt, and configured to measure a number of times of the occurrence of the response delay, wherein the inference portion is configured to infer whether the response delay is the factor causing the slippage of the belt, based on the number of times of the occurrence of the slippage of the belt and the number of times of the occurrence of the response delay.

According to a fourth aspect of the invention, in the diagnostic apparatus according to the second aspect of the invention, the inference portion is configured to calculate a correlation coefficient between the number of times of the occurrence of the slippage of the belt and the number of times of the occurrence of the hydraulic vibration, and is configured to infer that the hydraulic vibration is the factor causing the slippage of the belt when the correlation coefficient is not smaller than a predetermined threshold value.

According to a fifth aspect of the invention, in the diagnostic apparatus according to the third aspect of the invention, the inference portion is configured to calculate a correlation coefficient between the number of times of the occurrence of the slippage of the belt and the number of times of the occurrence of the response delay, and is configured to infer that the response delay is the factor causing the slippage of the belt when the correlation coefficient is not smaller than a predetermined threshold value.

According to a sixth aspect of the invention, in the diagnostic apparatus according to the second aspect of the invention, the inference portion is configured to infer that the hydraulic vibration is the factor causing the slippage of the belt, when a ratio of the number of times of the occurrence of the hydraulic vibration to the number of times of the occurrence of the slippage of the belt is not smaller than a predetermined threshold value.

According to a seventh aspect of the invention, in the diagnostic apparatus according to the third aspect of the invention, the inference portion is configured to infer that the response delay is the factor causing the slippage of the belt, when a ratio of the number of times of the occurrence of the response delay to the number of times of the occurrence of the slippage of the belt is not smaller than a predetermined threshold value.

In the diagnostic apparatus according to the first aspect of the invention, the factor causing the slippage of the belt is inferred, based on at least one of the hydraulic pressure of the working fluid supplied to the hydraulic actuator of the primary pulley and the hydraulic pressure of the working fluid supplied to the hydraulic actuator of the secondary pulley, upon the occurrence of the slippage of the belt. It is therefore possible to take countermeasures against the inferred factor causing the slippage, namely, take suitable countermeasures by taking account of the inferred factor causing the slippage, whereby the occurrence of the slippage can be suppressed and a reduction of durability of the belt can be suppressed.

In the diagnostic apparatus according to the second aspect of the invention, it is possible to infer whether the hydraulic vibration is the factor causing the slippage of the belt, by measuring the number of times of the occurrence of the slippage of the belt and the number of times of the occurrence of the hydraulic vibration.

In the diagnostic apparatus according to the third aspect of the invention, it is possible to infer whether the response delay is the factor causing the slippage of the belt, by measuring the number of times of the occurrence of the slippage of the belt and the number of times of the occurrence of the response delay.

In the diagnostic apparatus according to the fourth aspect of the invention, it is possible to infer whether the hydraulic vibration is the factor causing the slippage of the belt, based on the correlation coefficient between the number of times of the occurrence of the slippage of the belt and the number of times of the occurrence of the hydraulic vibration.

In the diagnostic apparatus according to the fifth aspect of the invention, it is possible to infer whether the response delay is the factor causing the slippage of the belt, based on the correlation coefficient between the number of times of the occurrence of the slippage of the belt and the number of times of the occurrence of the response delay.

In the diagnostic apparatus according to the sixth aspect of the invention, it is possible to infer whether the hydraulic vibration is the factor causing the slippage of the belt, based on the ratio of the number of times of the occurrence of the hydraulic vibration to the number of times of the occurrence of the slippage of the belt.

In the diagnostic apparatus according to the seventh aspect of the invention, it is possible to infer whether the response delay is the factor causing the slippage of the belt, based on the ratio of the number of times of the occurrence of the response delay to the number of times of the occurrence of the slippage of the belt.

DETAILED DESCRIPTION OF PREFERRED EMBODIMENTS

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
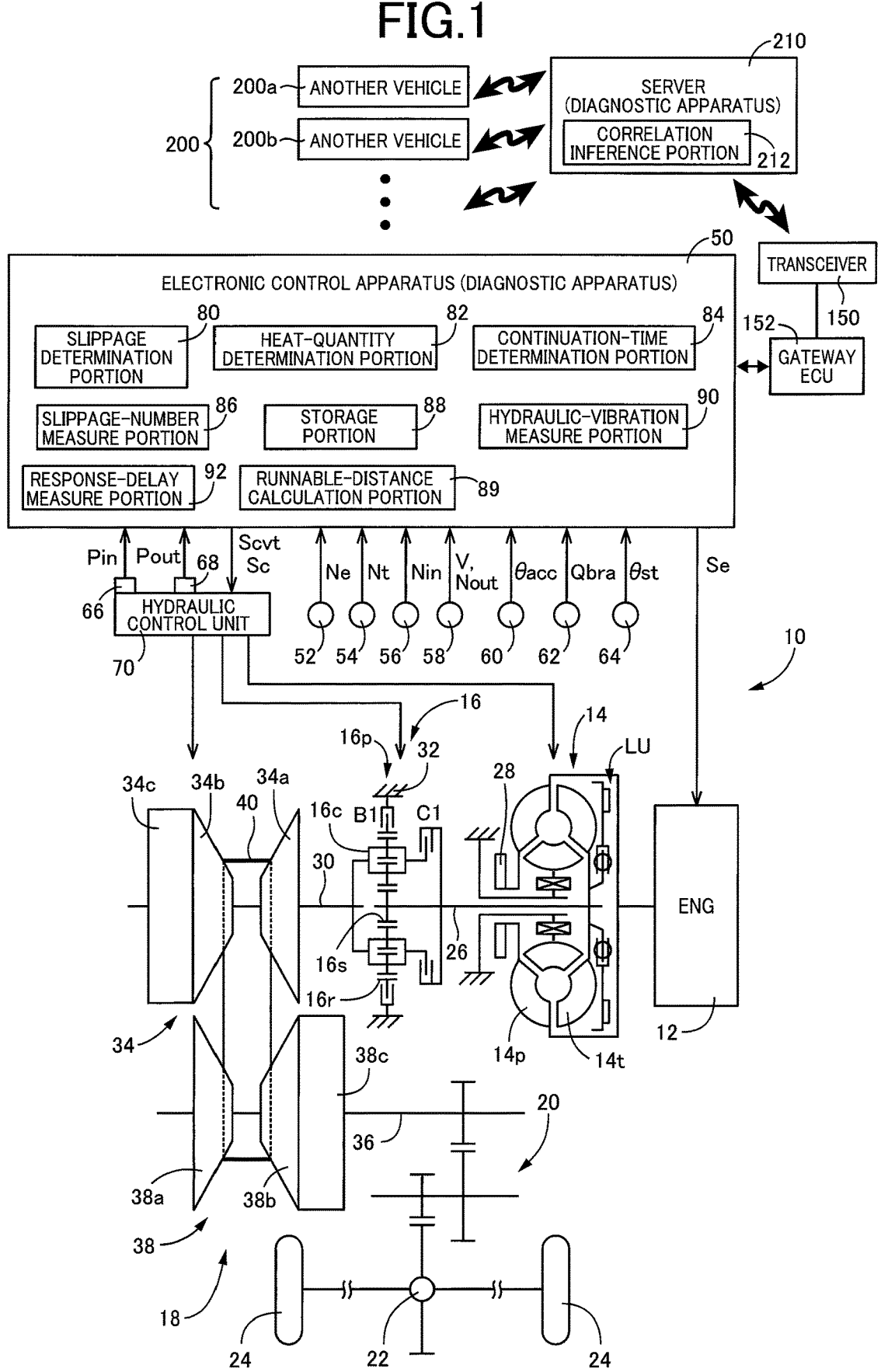
FIG. 1 is a schematic view showing a construction of a vehicle to which the present invention is applied, and showing also major portions of control functions and control systems that are provided to perform various control operations in the vehicle.

FIG. 1 is a schematic view showing a construction of a vehicle 10 to which the present invention is applied, and showing also major portions of control functions and control systems that are provided to perform various control operations in the vehicle 10. As shown in FIG. 1, the vehicle 10 includes an engine 12 as a drive force source for driving the vehicle 10, a torque converter 14 as a fluid-operated type drive-force transmission device, a forward/reverse switching device 16, a belt-type continuously-variable transmission 18, a reduction gear device 20, a differential gear device 22 and right and left drive wheels 24. In the vehicle 10, a drive force outputted by the engine 12 is transmitted to the right and left wheels 24, sequentially through the torque converter 14, forward/reverse switching device 16, continuously-variable transmission 18, reduction gear device 20 and differential gear device 22, for example.

The torque converter 14 includes a pump impeller 14$p$ and a turbine impeller 14$t$ and is configured to transmit the drive force through a fluid. The pump impeller 14$p$ is connected to the engine 12, while the turbine impeller 14$t$ is connected to the forward/reverse switching device 16 through a turbine shaft 26. The torque converter 14 is provided with a known lockup clutch LU that is configured to connect between input and output rotary members of the torque converter 14, namely, between the pump impeller 14$p$ and the turbine impeller 14$t$. An operation state of the lockup clutch LU is categorized into, for example, three states that consist of a so-called lockup released state (lockup off) in which the lockup clutch LU is released, a so-called lockup slipped state (slipped state) in which the lockup clutch LU is partially-engaged (slip-engaged) with slippage and a so-called lockup engaged state (lockup on) in which the lockup clutch LU is fully engaged.

With the lockup clutch LU being placed in the release state, the torque converter 14 provides a torque boost effect. With the lockup clutch LU being placed in the engaged state, the pump impeller 14p and the turbine impeller 14t are rotated integrally with each other whereby the drive force of the engine 12 is directly transmitted toward the forward/reverse switching device 16. With the lockup clutch LU being slip-engaged, the turbine shaft 26 is rotated following rotation of a crank shaft of the engine 12 with a certain slip amount during running of the vehicle 10 in a driving state (power-on state), and the crank shaft of the engine 12 is rotated following rotation of the turbine shaft 26 with a certain slip amount during running of the vehicle 10 in a driven state (power-off state). Further, a mechanical oil pump 28 is connected to the pump impeller 14p.

The forward/reverse switching device 16 is constituted mainly by a forward drive clutch C1, a reverse drive brake B1 and a planetary gear device 16p of double-pinion type. The planetary gear device 16p includes a sun gear 16s connected integrally to the turbine shaft 26 of the torque converter 14 and a carrier 16c connected integrally to the input shaft 30 of the continuously-variable transmission 18. The carrier 16c and the sun gear 16s are to be selectively connected to each other through the forward drive clutch C1, so that the planetary gear device 16p is rotated as a unit when the carrier 16c and the sun gear 16s are connected to each other. That is, the forward drive clutch C1 is a clutch element by which the planetary gear device 16p is to be selectively rotated as a unit.

The planetary gear device 16p further includes a ring gear 16r that is be selectively fixed to a housing 32 as a non-rotary member through the reverse drive brake B1. That is, the reverse drive brake B1 serves as a brake element that is configured to selectively connect one of rotary elements (in the form of the sun gear 16s, carrier 16c and ring gear 16r) to the housing 32. Each of the forward drive clutch C1 and the reverse drive brake B1 is a known hydraulically-operated frictional engagement device.

In the forward/reverse switching device 16 constructed as described above, when the forward drive clutch C1 is engaged with the reverse drive brake B1 being released, the turbine shaft 26 is connected to the input shaft 30 whereby a forward drive-force transmission path is established. When the reverse drive brake B1 is engaged with the forward drive clutch C1 being released, a reverse drive-force transmission path is established in the forward/reverse switching device 16 whereby the input shaft 30 is to be rotatable in a direction opposite to a direction of rotation of the turbine shaft 26. When the forward drive clutch C1 and the reverse drive brake B1 are both released, the forward/reverse switching device 16 is placed in a neutral state (drive-force transmission cut-off state) in which transmission of the drive force is cut off.

The continuously-variable transmission 18 includes an input-side pulley in the form of a primary pulley 34 provided on the input shaft 30, an output-side pulley in the form of a secondary pulley 38 provided on an output shaft 36, and a transmission belt 40 wound on or looped over the primary and secondary pulleys 34, 38. Each of the pulleys 34, 38 has a variable effective diameter. The continuously-variable transmission 18 constitutes a part of a drive-force transmission path between the forward/reverse switching device 16 and the drive wheels 24, and is configured to transmit the drive force, owing to a friction force acting between the transmission belt 40 and each of the primary and secondary pulleys 34, 38. The transmission belt 40 is constituted by a compression-type endless annular transmission belt that includes an endless annular hoop and a multiplicity of thick-plate-shaped block elements that are held by the endless annular hoop so as to be arranged in their thickness direction corresponding to a circumferential direction of the transmission belt 40, along the endless annular hoop. It is noted that the transmission belt 40 corresponds to "belt" recited in the appended claims.

The primary pulley 34 as the input-side pulley includes an input-side fixed rotary body in the form of a fixed sheave 34a that is fixed to the input shaft 30, an input-side movable rotary body in the form of a movable sheave 34b unrotatable relative to the input shaft 30 and axially movable relative to the input shaft 30, and a hydraulic actuator (hydraulic cylinder) 34c configured to apply an input-side thrust (primary thrust) Win (=primary pressure Pin×pressure receiving area) for changing a width of a V-shaped groove defined between the fixed and movable sheaves 34a, 34b of the primary pulley 34.

The secondary pulley 38 as the output-side pulley includes an output-side fixed rotary body in the form of a fixed sheave 38a that is fixed to the output shaft 36, an output-side movable rotary body in the form of a movable sheave 38b unrotatable relative to the output shaft 36 and axially movable relative to the output shaft 36, and a hydraulic actuator (hydraulic cylinder) 38c configured to apply an output-side thrust (secondary thrust) Wout (=secondary pressure Pout×pressure receiving area) for changing a width of a V-shaped groove defined between the fixed and movable sheaves 38a, 38b of the secondary pulley 38.

The vehicle 10 further includes a hydraulic control unit (hydraulic control circuit) 70 configured to control the primary pressure Pin that is a hydraulic pressure of a working fluid supplied to the hydraulic actuator 34c of the primary pulley 34 and also the secondary pressure Pout that is a hydraulic pressure of the working fluid supplied to the hydraulic actuator 38c of the secondary pulley 38. The primary thrust Win and the secondary thrust Wout are controlled with the primary pressure Pin and the secondary pressure Pout being regulated or controlled. With the primary and secondary thrusts Win, Wout being changed, the width of the V-shaped groove of the pulleys 34, 38 are changed whereby the effective diameter of each of the pulleys 34, 38, namely, a diameter of a mounted portion of each of the pulleys 34, 38 on which the transmission belt 40 is mounted, is changed, so that a gear ratio γ(=input-shaft rotational speed Nin/output rotational speed Nout) is continuously changed, while the friction force (belt clamp force) acting between the transmission belt 40 and each of the pulleys 34, 38 is controlled for avoiding slippage of the transmission belt 40 on the pulleys 34, 38. Thus, with the primary thrust Win and the secondary thrust Wout being controlled, the actual gear ratio γ is controlled to a target gear ratio γtgt while the slippage of the transmission belt 40 is restrained.

The vehicle 10 is provided with an electronic control apparatus 50 configured to perform various control operations in the vehicle 10. For example, the electronic control apparatus 50 includes a so-called microcomputer incorporating a CPU, a ROM, a RAM and an input-output interface. The CPU performs the control operations of the vehicle 10, by processing various input signals, according to control programs stored in the ROM, while utilizing a temporary data storage function of the RAM. The electronic control apparatus 50 is configured to perform, for example, an engine control operation for controlling an output of the engine 12, a shifting control operation for the continuously-variable transmission 18 and a belt-clamp-force control operation for the continuously-variable transmission 18. The electronic control apparatus 50 may be constituted by two or more control units exclusively assigned to perform different control operations such as the engine control operation for the engine 12 and a hydraulic-pressure control operation (including the shifting control operation and the belt-clamp-force control operation) for the continuously-variable transmission 18.

The electronic control apparatus 50 receives various input signals based on values detected by respective sensors provided in the vehicle 10. Specifically, the electronic control apparatus 50 receives: an output signal of an engine speed sensor 52 indicative of an engine rotational speed Ne (rpm) which is a rotational speed of the engine 12; an output signal of a turbine speed sensor 54 indicative of a turbine rotational speed Nt (rpm); an output signal of an input-shaft speed sensor 56 indicative of a an input-shaft rotational speed Nin (rpm) of the input shaft 30; an output signal of an output-shaft speed sensor 58 indicative of an output-shaft rotational speed Nout (rpm) which is a rotational speed of the output shaft 36 and which corresponds to the running speed V (km/h) of the vehicle 10; an output signal of an accelerator-opening degree sensor 60 indicative of an accelerator opening degree θacc (%); an output signal of a brake-operation amount sensor 62 indicative of a brake operation amount Qbra that is an operation amount of a brake operation member operated by a vehicle driver so as to operate a wheel brake device; an output signal of a steering angle sensor 64 indicative of a steering angle θst of a steering wheel; an output signal of a hydraulic pressure sensor 66 indicative of the primary pressure Pin (Pa) that is the hydraulic pressure (actual pressure value) of the working fluid supplied to the hydraulic actuator 34c of the primary pulley 34; and an output signal of a hydraulic pressure sensor 68 indicative of the secondary pressure Pout (Pa) that is the hydraulic pressure (actual pressure value) of the working fluid supplied to the hydraulic actuator 38c of the primary pulley 38. It is noted that the input-shaft rotational speed Nin is equal to a primary rotational speed Npri that is a rotational speed of the primary pulley 34, and that the output-shaft rotational speed Nout is equal to a secondary rotational speed Nsec that is a rotational speed of the secondary pulley 38.

The electronic control apparatus 50 generates various output signals which are supplied to various devices (such as the engine 12 and the hydraulic control unit 70) provided in the vehicle 10, and which include an engine-output-control command signal Se for controlling the output of the engine 12, a CVT-hydraulic-pressure-control command signal Scvt for controlling hydraulic pressures related to shifting actions of the continuously-variable transmission 18, and a hydraulic-pressure-control command signal Sc for controlling hydraulic pressures related to engaging actions of the lockup clutch LU, the forward drive clutch C1 and the reverse drive brake B1.

The electronic control apparatus 50 calculates a required drive force in accordance with a pre-stored relationship, based on the running speed V and the accelerator opening degree θacc detected by the accelerator-opening degree sensor 60, and determines a target engine output and a target gear ratio γtgt that cooperate with each other to provide the required drive force with an optimum fuel efficiency. Then, the electronic control apparatus 50 executes the engine control operation for controlling the output of the engine 12 so as to obtain the target engine output, and executes the shifting control operation for controlling the gear ratio γ of the continuously-variable transmission 18 so as to obtain the target gear ratio γtgt.

The vehicle 10 includes a transceiver 150 and a gateway ECU 152, for transmitting and receiving various data to and from a server 210.

The transceiver 150 is a device configured to communicate with a server 210 as an external device which is present apart from the vehicle 10 and is provided outside the vehicle 10. The server 210 is a system present on a network outside the vehicle 10, and is configured to receive, process, analyze, store and supply the various data such as vehicle state information. The server 210 transmits and receives the various data to and from other vehicles 200 as well as to and from the vehicle 10. The vehicle state information represents, for example, an operation or driving state relating to driving of the vehicle 10, which is detected by the various sensors or the like. This driving state is represented, for example, by the accelerator operation degree θacc, the running speed V, the primary pressure Pin that is the hydraulic pressure of the working fluid supplied to the hydraulic actuator 34c of the primary pulley 34, and the secondary pressure Pout that is the hydraulic pressure of the working fluid supplied to the hydraulic actuator 38c of the secondary pulley 38.

The gateway ECU 152 has substantially the same hardware construction as the electronic control apparatus 50, and is constituted by, for example, a relay device provided to rewrite programs and/or data stored in a rewritable ROM included in the electronic control apparatus 50. The gateway ECU 152 is connected to the transceiver 150, and is configured to rewrite the programs stored in the ROM, for example, through a wireless communication between the transceiver 150 and the server 210. The server 210 serves as a software distribution center configured to distribute programs for the rewriting.

By the way, it is known that, during running of the vehicle 10, so-called small or micro slippage could occur, namely, slippage of the transmission belt 40 on the pulleys 34, 38 could occur for an extremely short time. Since the micro slippage could cause wear of the transmission belt 40 and affect durability of the transmission belt 40, it is necessary to accurately determine the occurrence of the micro slippage. Further, in event of the occurrence of the micro slippage, it is desirable to specify a factor causing the micro slippage. In the present embodiment, the electronic control apparatus 50 includes a function of determining the occurrence of the micro slippage and a function of inferring the factor causing the micro slippage. For performing these functions, the electronic control apparatus 50 includes a slippage determination portion 80 serving as a slippage determination means, a heat-quantity determination portion 82 serving as a heat-quantity determination means, a continuation-time determination portion 84 serving as a continuation-time determination means, a slippage-number measure portion 86 serving as a slippage-number measure means, a storage portion 88 serving as a storage means, a runnable-distance calculation portion 89 serving as a runnable-distance calculation means, a hydraulic-vibration measure portion 90 serving as a hydraulic-vibration measure means, and a response-delay measure portion 92 serving as a response-delay measure means.

The slippage determination portion 80 determines whether the micro slippage has occurred or not during running of the vehicle 10. The slippage determination portion 80 calculates, as needed, a gear ratio γ(=Nin/Nout=Npri/Nsec) of the continuously-variable transmission 18 that is a ratio of the rotational speed of the primary pulley 34 to the rotational speed of the secondary pulley 38. Further, the slippage determination portion 80 calculates, as needed, a first-order derivative $\Delta\gamma$ of the gear ratio $\gamma$, which corresponds to a rate of change of the gear ratio $\gamma$. The first-order derivative $\Delta\gamma$ of the gear ratio $\gamma$ is obtained by numerically differentiating the gear ratio $\gamma$, or smoothing the gear ratio $\gamma$ through a filter or the like and then obtaining a gradient of a smoothed value of the gear ratio $\gamma$. Then, the slippage determination portion 80 calculates a second-order derivative $\Delta\Delta\gamma$ of the gear ratio $\gamma$. The second-order derivative $\Delta\Delta\gamma$ of the gear ratio $\gamma$ is obtained by numerically differentiating the first-order derivative $\Delta\gamma$, or smoothing the first-order derivative $\Delta\gamma$ through a filter or the like and then obtaining a gradient of a smoothed value of the first-order derivative $\Delta\gamma$.

Further, the slippage determination portion 80 determines whether the calculated first-order derivative $\Delta\gamma$ of the gear ratio $\gamma$ is at least a first threshold value $\alpha 1$ or not. The first threshold value $\alpha 1$ is a predetermined value that is obtained by experimentation or determined by an appropriate design theory, such that the first threshold value $\alpha 1$ corresponds to a lower limit of a range of the first-order derivative $\Delta\gamma$ in which it can be determined that the micro slippage of the transmission belt 40 has occurred. Then, when determining that the first-order derivative $\Delta\gamma$ is not smaller than the first threshold value $\alpha 1$, the slippage determination portion 80 determines whether the second-order derivative $\Delta\Delta\gamma$ of the gear ratio $\gamma$ is at least a second threshold value $\alpha 2$ or not. The second threshold value $\alpha 2$ is a predetermined value that is obtained by experimentation or determined by an appropriate design theory, such that the second threshold value $\alpha 2$ corresponds to a lower limit of a range of the second-order derivative $\Delta\Delta\gamma$ in which it can be determined that the micro slippage of the transmission belt 40 has occurred. The slippage determination portion 80 determines that the micro slippage has occurred when the first-order derivative $\Delta\gamma$ of the gear ratio $\gamma$ is not smaller than the first threshold value $\alpha 1$ and the second-order derivative $\Delta\Delta\gamma$ of the gear ratio $\gamma$ is not smaller than the second threshold value $\alpha 2$. In this instance, the slippage determination portion 80 sets a provisional flag of the occurrence of the micro slippage, to ON.

The occurrence of the micro slippage can be determined based on only the first-order derivative $\Delta\gamma$ of the gear ratio $\gamma$. However, there might be a case in which the micro slippage cannot be distinguished from an abrupt change of the gear ratio $\gamma$, which is caused by an abrupt shift operation or by an input from a road surface such as a stepped surface, by seeing only the first-order derivative $\Delta\gamma$. However, in the present embodiment, the occurrence of the micro slippage is determined based on not only the first-order derivative $\Delta\gamma$ of the gear ratio $\gamma$ but also the second-order derivative $\Delta\Delta\gamma$ of the gear ratio $\gamma$, so that the occurrence of the micro slippage can be accurately determined.

When the occurrence of the micro slippage is determined by the slippage determination portion 80, the heat-quantity determination portion 82 calculates the heat quantity Qdot that is a quantity of heat generated by the micro slippage. The heat quantity Qdot is obtained based on a product of a friction force generated between the secondary pulley 38 and the transmission belt 40, and a relative slip speed of the secondary pulley 38 and the transmission belt 40. Specifically, the heat quantity Qdot is calculated in accordance with expression (1) given below. In the expression (1), "$\mu$" represents a coefficient of static friction between the secondary pulley 38 and the transmission belt 40 and the static friction coefficient, "R" represents a winding radius of the secondary pulley 38 on which the transmission belt 40 is wound, and "$\theta$" represents a sheave angle of the secondary pulley 38 that defines the V-shaped groove in which the transmission belt 40 is disposed to be gripped. Further, in the expression (1), "Wout" represents a secondary thrust, and corresponds to a clamp force by which the transmission belt 40 is clamped by the secondary pulley 38. The heat-quantity determination portion 82 calculates the heat quantity Qdot, as needed, in accordance with the expression (1), from a point of time at which the occurrence of the micro slippage is determined, and then obtains a maximum value (peak value) of the heat quantity Qdot.

$$Q\text{dot}=2\times\mu\times R\times W\text{out}/\cos\theta\times[N\text{sec}-(N\text{pri}/\gamma)] \tag{1}$$

After calculating the heat quantity Qdot, the heat-quantity determination portion 82 determines whether the maximum value of the heat quantity Qdot is at least a third threshold value $\alpha 3$ or not. The third threshold value $\alpha 3$ is a predetermined value that is obtained by experimentation or determined by an appropriate design theory, such that the third threshold value $\alpha 3$ corresponds to, for example, a lower limit of a range of the heat quantity Qdot in which it is considered that the durability of the transmission belt 40 is affected. Therefore, when the heat-quantity determination portion 82 determines that the maximum value of the heat quantity Qdot is not smaller than the third threshold value $\alpha 3$, it is determined that the occurred micro slippage is slippage affecting the durability of the transmission belt 40. On the other hand, when the heat-quantity determination portion 82 determines that the maximum value of the heat quantity Qdot is smaller than the third threshold value $\alpha 3$, it is determined that the occurred micro slippage is slippage not affecting the durability of the transmission belt 40.

When the occurrence of the micro slippage is detected, the continuation-time determination portion 84 measures a continuation time tcon that is a length of time from the determination of the occurrence of the micro slippage until termination of the micro slippage, and determines whether the continuation time tcon is at most a fourth threshold value $\alpha 4$ or not. The termination of the micro slippage is determined, for example, when the first-order derivative $\Delta\gamma$ of the gear ratio $\gamma$ has become smaller than the first threshold value $\alpha 1$. The fourth threshold value $\alpha 4$ is a predetermined value that is obtained by experimentation or determined by an appropriate design theory, such that the fourth threshold value $\alpha 4$ corresponds to, for example, an upper limit of a range of the continuation time tcon in which it can be determined that the occurred slippage is definitely the micro slippage. When the continuation-time determination portion 84 determines that the continuation time tcon is not longer than the fourth threshold value $\alpha 4$, it is determined that the occurred slippage is definitely the micro slippage. On the other hand, when the continuation-time determination portion 84 is longer than the fourth threshold value $\alpha 4$, it is determined that the occurred slippage is a large or macro slippage that continues for a relatively large length of time. The macro slippage is a phenomenon that is to be distinguished from the micro slippage.

The slippage determination portion 80 sets a definitive flag of the occurrence of the micro slippage, to ON, in a case in which the occurrence of the micro slippage is detected with the heat quantity Qdot being not smaller than the third threshold value $\alpha 3$ and with the continuation time tcon being not longer than the fourth threshold value $\alpha 4$.

The slippage-number measure portion 86 measures a number N1 (integrated value) of times of occurrence of the micro slippage, which corresponds to a number of times of the judgement of the occurrence of the micro slippage in the vehicle 10. The slippage-number measure portion 86 adds one to the number N1 of times of occurrence of the micro slippage, each time when the definitive flag of the occurrence of the micro slippage is set to ON. Further, the slippage-number measure portion 86 determines whether the number N1 of times of occurrence of the micro slippage has become at least a fifth threshold value $\alpha 5$ or not. When the slippage-number measure portion 86 determines that the number N1 of times of occurrence of the micro slippage is not smaller than the fifth threshold value $\alpha 5$, it is determined that there is a possibility that a problem has occurred in the transmission belt 40, and the possibility of the problem is informed to a drive of the vehicle 10 through, for example, a warning lamp in a display device provided inside the vehicle 10. The fifth threshold value $\alpha 5$ is set a value described below.

When the occurrence of the micro slippage is detected, the storage portion 88 stores therein a time (year, month, day, hour, minute, second) of the occurrence of the micro slippage, a current running distance L, the number N1 of times of occurrence of the micro slippage, the heat quantity Qdot (peak value) upon the occurrence of the micro slippage, a command pressure value Pintgt and a primary pressure Pin (hereinafter referred to as "actual pressure value Pin") of the hydraulic actuator 34c of the primary pulley 34 upon the occurrence of the micro slippage, a command pressure value Pouttgt and a secondary pressure Pout (hereinafter referred to as "actual pressure value Pout") of the hydraulic actuator 38c of the secondary pulley 38 upon the occurrence of the micro slippage, and an input torque Tin that is a value of a torque inputted to the continuously-variable transmission 18 upon the occurrence of the micro slippage, for example. The input torque Tin is calculated, as needed, based on the accelerator opening degree θacc, the running speed V and a torque ratio of the torque converter 14, for example. When the micro slippage is detected for the first time in the vehicle 10, the storage portion 88 stores therein, for example, the time of the first occurrence of the micro slippage. The factor causing the micro slippage can be inferred by analyzing the above-described various data (various information) stored in the storage portion 88.

Further, during a period from start of the micro slippage until termination of the micro slippage, the storage portion 88 calculates, as needed, a difference $\Delta$Pin (=Pintgt-Pin) between the command pressure value Pintgt and the actual pressure value Pin (primary pressure Pin) of the hydraulic actuator 34c of the primary pulley 34, and stores the difference $\Delta$Pin therein. Similarly, during the period from start of the micro slippage until termination of the micro slippage, the storage portion 88 calculates, as needed, a difference $\Delta$Pout (=Poutgt-Pout) between the command pressure value Poutgt and the actual pressure value Pout (secondary pressure Pout) of the hydraulic actuator 38c of the secondary pulley 38, and stores the difference $\Delta$Pout therein. The factor causing the micro slippage can be inferred also from these differences $\Delta$Pin, $\Delta$Pout stored in the storage portion 88.

The various data stored in the storage portion 88 are transmitted to the server 210 through, for example, the transceiver 150, and are stored in the server 210. Further, when the micro slippage has occurred in any one of the other vehicles 200, too, the various data are transmitted to the server 210 so as to be stored in the server 210. In the server 210, based on the various data related to the micro slippage and transmitted from the vehicles 10, 200, the factor causing the micro slippage is analyzed, and the threshold values and the like used for the determination of the occurrence of the micro slippage are obtained.

Figure 2:
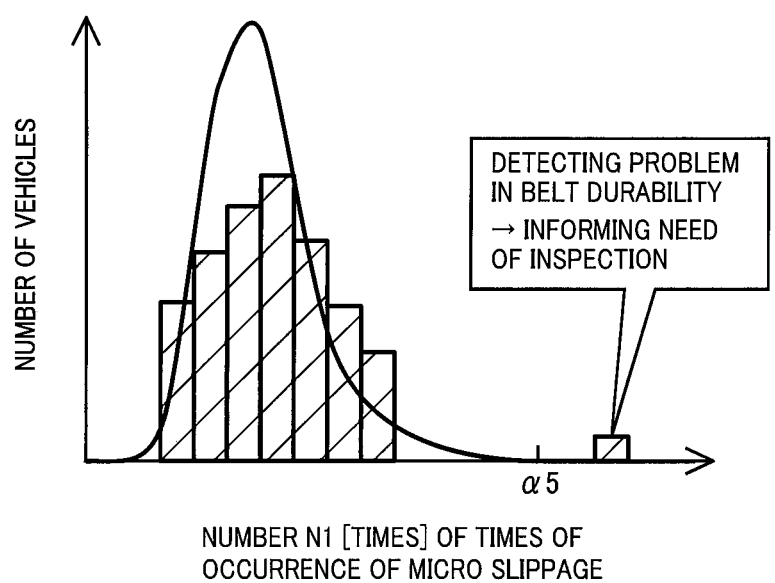
FIG. 2 is a distribution map showing a number of vehicles in each number of times of occurrence of micro slippage.

The above-described fifth threshold value $\alpha 5$ is obtained from a distribution map of FIG. 2 in which its horizontal axis represents the number N1 of times of occurrence of the micro slippage while its vertical axis represents a number of the vehicles corresponding to each number N1 of times of the occurrence of the micro slippage. The fifth threshold value $\alpha 5$ is determined in view of a tendency of occurrence of the micro slippage as shown in FIG. 2, by using a statistical method or a machine or deep learning. Then, the determined fifth threshold value $\alpha 5$ is transmitted to the electronic control apparatus 50 of each of the vehicles. It is determined that a problem might have occurred in the durability of the transmission belt 40 of the vehicle or vehicles in which the number N1 of times of occurrence of the micro slippage has exceeded the fifth threshold value $\alpha 5$, and such a vehicle or vehicles are informed of need to be inspected. The distribution map of FIG. 2 may be prepared for each of various ranges of the running distance L. That is, the fifth threshold value $\alpha 5$ may be a value that varies depending on the running distance L. Thus, it is determined that an anomaly of the transmission belt 40 might have occurred in the vehicle or vehicles in which the number N1 of times of occurrence of the micro slippage is larger than in the other vehicles in spite of the same running distance L.

Figure 3:
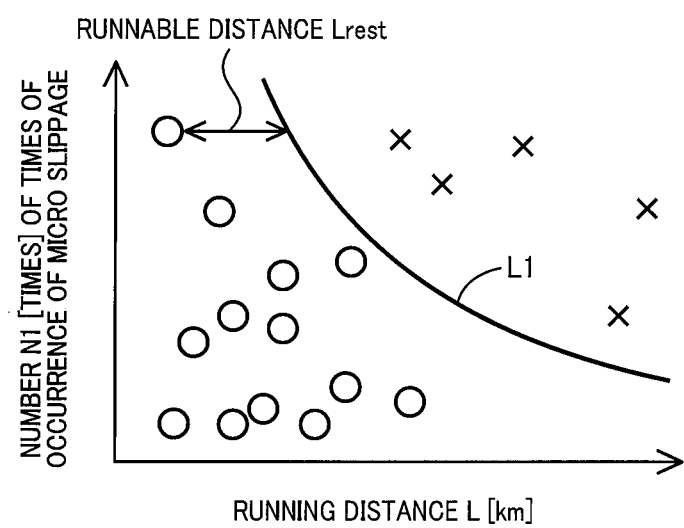
FIG. 3 is a distribution map showing a relationship between a running distance of each vehicle and the number of times of occurrence of the micro slippage in the vehicle.

FIG. 3 is a distribution map showing a relationship between the running distance L of each vehicle and the number N1 of times of occurrence of the micro slippage in the vehicle, wherein its horizontal axis represents the running distance L while its vertical axis represents the number N1 of times of occurrence of the micro slippage. In the server 210, it is possible to define a runnable limit line L1 that represents a threshold value Lcri for each number of times of occurrence of the micro slippage, wherein the threshold value Lcri is a threshold value of a runnable maximum distance that is dependent on the number N1 of times of occurrence of the micro slippage, as shown in FIG. 3. Thus, from a threshold value Lcri of the runnable maximum distance and a current value of the running distance L, it is possible to obtain a runnable distance Lrest that is a distance for which the vehicle can run further. The runnable distance Lrest corresponds to a difference (Lcri-L) between the above-described threshold value Lcri and the current value of the running distance L. In FIG. 3, "○" represents a vehicle in which it is determined that there is no problem in the durability of the transmission belt 40, while "x" represents a vehicle in which it is determined that there is a problem in the durability of the transmission belt 40. The runnable limit line L1 is defined or determined based on distributions of the vehicles represented by "○" and "x", by using a statistical method or a machine or deep learning. The runnable-distance calculation portion 89 obtains the threshold value Lcri of the runnable maximum distance, by applying the number N1 of times of occurrence of the micro slippage to the runnable limit line L1, and then calculates the runnable distance Lrest (for which the vehicle can run further) that corresponds to the difference (Lcri-L) between the threshold value Lcri and the current value of the running distance L.

When the occurrence of the micro slippage is determined, the hydraulic-vibration measure portion 90 determines whether a hydraulic fluctuation or vibration has occurred in the actual pressure value Pout of the hydraulic actuator 38c of the secondary pulley 38 substantially concurrently with the occurrence of the micro slippage. The hydraulic-vibration measure portion 90 calculates a standard deviation of the actual pressure value Pout in a period from start of the micro slippage until termination of the micro slippage, and determines that the hydraulic vibration has occurred when the standard deviation is at least a sixth threshold value $\alpha 6$. In this instance, the hydraulic-vibration measure portion 90 sets a hydraulic-vibration occurrence flag to ON. The sixth threshold value $\alpha 6$ is a predetermined value that is obtained by experimentation or determined by an appropriate design theory, such that the sixth threshold value $\alpha 6$ corresponds to a lower limit of a range of the standard deviation in which it can be determined that the hydraulic vibration has occurred. When setting the hydraulic-vibration occurrence flag to ON, the hydraulic-vibration measure portion 90 adds one to a number N2 (integrated value) of times of occurrence of the hydraulic vibration upon occurrence of the micro slippage (during a period of occurrence of the micro slippage). Thus, the hydraulic-vibration measure portion 90 measures the number N2 of times of occurrence of the hydraulic vibration.

The information (data) relating to the number N1 of times of occurrence of the micro slippage and the number N2 of times of occurrence of the hydraulic vibration in each of the vehicles 10, 200 is transmitted to the server 210 through, for example, the transceiver 150, and it is determined in the server 210 whether there is a correlation between the micro slippage and the hydraulic vibration. The server 210 functionally includes a correlation inference portion 212 serving as a correlation inference means for inferring whether the correlation is present between the micro slippage and the hydraulic vibration. The correlation inference portion 212 infers the factor causing the micro slippage, based on the actual pressure value Pout (secondary pressure Pout) that is an actual value of the hydraulic pressure of the working fluid supplied to the hydraulic actuator 38c of the secondary pulley 38. Specifically described, the correlation inference portion 212 infers the factor causing the micro slippage, based on the number N2 of times of occurrence of the hydraulic vibration of the actual pressure value Pout upon occurrence of the micro slippage and also a number N3 of times of occurrence of a response delay of the actual pressure value Pout upon occurrence of the micro slippage. It is noted that, in the present embodiment, each of the electronic control apparatus 50 and the server 210 corresponds to "diagnostic apparatus" recited in the appended claims, and the correlation inference portion 212 corresponds to "inference portion (that is configured to infer a factor causing the slippage of the belt)" recited in the appended claims. Further, it can be considered that, in the present embodiment, the electronic control apparatus 50 of the vehicle 10 cooperates with the server 210, or with the server 210 and electronic control apparatuses provided in the respective other vehicles 200, to constitute a diagnostic system for inferring the factor causing the slippage of the belt.

The correlation inference portion 212 infers whether the correlation is present between the micro slippage and the hydraulic vibration, namely, whether the hydraulic vibration is the factor causing the micro slippage, based on the number N1 of times of occurrence of the micro slippage and the number N2 of times of occurrence of the hydraulic vibration in each of the vehicles 10, 200. Specifically described, the correlation inference portion 212 calculates a correlation coefficient R1 between the number N1 of times of occurrence of the micro slippage and the number N2 of times of occurrence of the hydraulic vibration. Then, the correlation inference portion 212 infers that the correlation is present between the micro slippage and the hydraulic vibration, namely, infers that the hydraulic vibration is the factor causing the micro slippage, when the correlation coefficient R1 is at least a seventh threshold value $\alpha 7$. The seventh threshold value $\alpha 7$ is a predetermined value that is obtained by experimentation or determined by an appropriate design theory, such that the seventh threshold value $\alpha 7$ is set to a value of the correlation coefficient R1, based on which the determination as to whether or not the correlation is present between the micro slippage and the hydraulic vibration can be made.

When the occurrence of the micro slippage is determined, the response-delay measure portion 92 determines whether the response delay of the secondary pressure Pout has occurred upon occurrence of the micro slippage (during the period of occurrence of the micro slippage). The response-delay measure portion 92 calculates the difference $\Delta$Pout (=Poutgt−Pout) between the command pressure value Poutgt and the actual pressure value Pout of the hydraulic actuator 38c of the secondary pulley 38, during the period from start of the micro slippage until termination of the micro slippage, and determines that the response delay of the secondary pressure Pout has occurred when the difference $\Delta$Pout is at least an eighth threshold value $\alpha 8$. In this instance, the response-delay measure portion 92 sets a pressure-response-delay occurrence flag to ON. The eighth threshold value $\alpha 8$ is a predetermined value that is obtained by experimentation or determined by an appropriate design theory, such that the eighth threshold value $\alpha 8$ corresponds to a lower limit of a range of the difference $\Delta$Pout in which it can be determined that the response delay of the secondary pressure Pout has occurred. When setting the pressure-response-delay occurrence flag to ON, the response-delay measure portion 92 adds one to the number N3 (integrated value) of times of occurrence of the response delay upon occurrence of the micro slippage (during a period of occurrence of the micro slippage). Thus, the response-delay measure portion 92 measures the number N3 of times of occurrence of the response delay.

The information (data) relating to the number N1 of times of occurrence of the micro slippage and the number N3 of times of occurrence of the response delay in each of the vehicles 10, 200 is transmitted to the server 210 through, for example, the transceiver 150, and it is determined in the server 210 whether there is a correlation between the micro slippage and the response delay of the hydraulic pressure. The correlation inference portion 212 included in the server 210 further includes a function of inferring whether the correlation is present between the micro slippage and the response delay of the hydraulic pressure.

The correlation inference portion 212 infers whether the correlation is present between the micro slippage and the response delay of the hydraulic pressure, namely, whether the response delay of the hydraulic pressure is the factor causing the micro slippage, based on the number N1 of times of occurrence of the micro slippage and the number N3 of times of occurrence of the response delay of the hydraulic pressure in each of the vehicles 10, 200. Specifically described, the correlation inference portion 212 calculates a correlation coefficient R2 between the number N1 of times of occurrence of the micro slippage and the number N3 of times of occurrence of the response delay of the hydraulic pressure. Then, the correlation inference portion 212 infers that the correlation is present between the micro slippage and the response delay of the hydraulic pressure, namely, infers that the response delay of the hydraulic pressure is the factor causing the micro slippage, when the correlation coefficient R2 is at least a ninth threshold value α9. The ninth threshold value α9 is a predetermined value that is obtained by experimentation or determined by an appropriate design theory, such that the ninth threshold value α9 is set to a value of the correlation coefficient R2, based on which the determination as to whether or not the correlation is present between the micro slippage and the response delay of the hydraulic pressure can be made.

Further, the correlation inference portion 212 determines whether there is a correlation between the micro slippage and production history data (production history information) of each vehicle, which have been obtained in a factory of the continuously-variable transmission 18 and/or the supplier (such as vehicle dealer), wherein the production history data include inspected data (such as hydraulic pressure characteristics, shift speed characteristics), an amount of working oil filled in the continuously-variable transmission 18 and dimensions of shims provided in the continuously-variable transmission 18. The correlation inference portion 212 calculates a correlation coefficient Ri between the number N1 of times of occurrence of the micro slippage and each data element of the production history data. When the correlation coefficient Ri is at least a threshold value αi that is set for the corresponding data element, the correlation inference portion 212 determines that there is a correlation between the micro slippage and the data element, namely, that the data element (that is determined to have the correlation with the micro slippage) is the factor causing the micro slippage.

Figure 4:
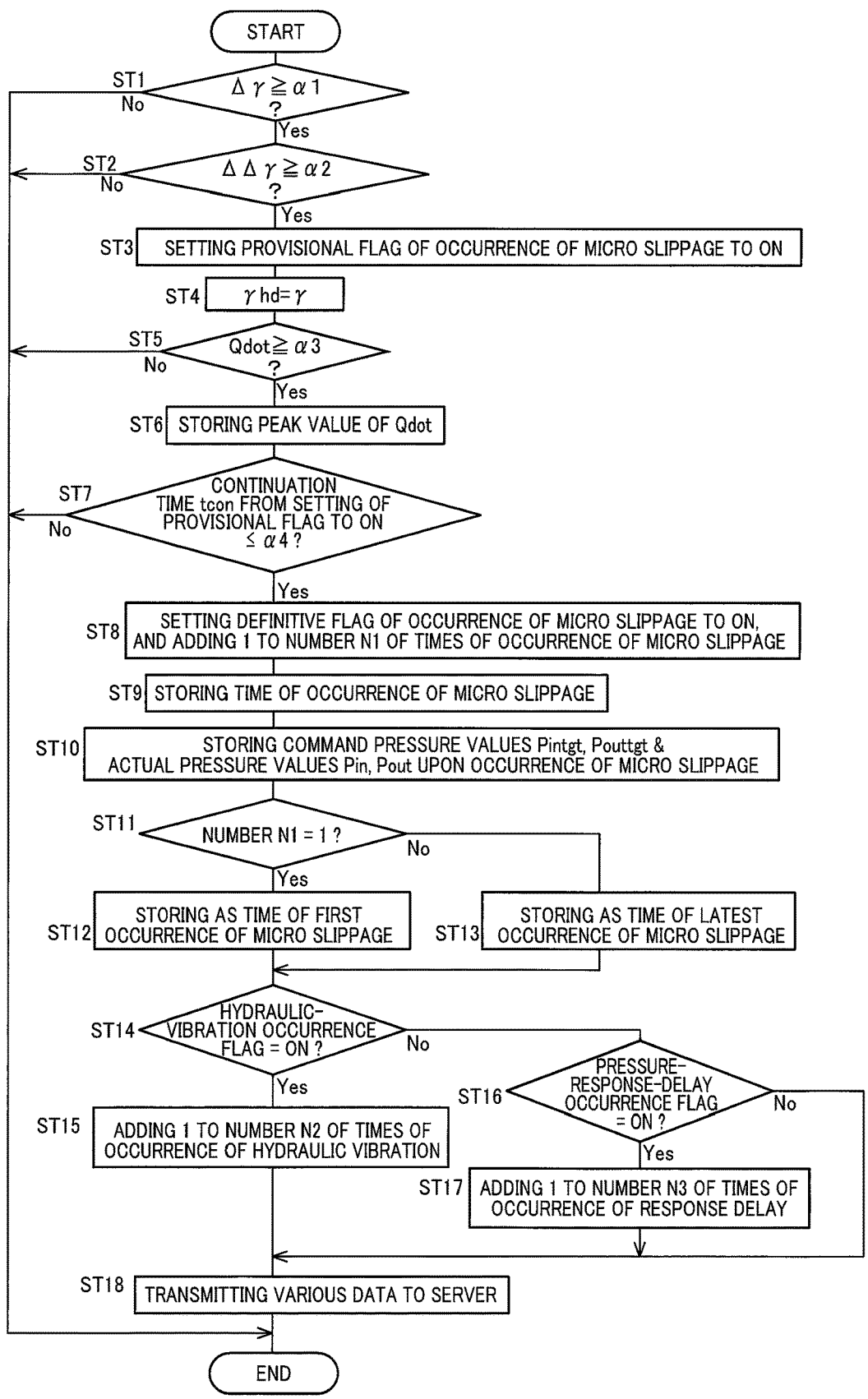
FIG. 4 is a flow chart for explaining a major portion of a control operation of an electronic control apparatus shown in FIG. 1, and for explaining a control routine executed by the electronic control apparatus, so as to determine the occurrence of the micro slippage during running of the vehicle and store or update various data upon the occurrence of the micro slippage.

FIG. 4 is a flow chart for explaining a major portion of a control operation of the electronic control apparatus 50, and for explaining a control routine executed by the electronic control apparatus 50, so as to determine the occurrence of the micro slippage during running of the vehicle and store or update various data upon the occurrence of the micro slippage. This control routine is executed in a repeated manner during running of the vehicle.

This control routine is initiated with step ST1 corresponding to control function of the slippage determination portion 80, which is implemented to determine whether the first-order derivative Δγ of the gear ratio γ is the first threshold value α1 or more. When a negative determination is made at step ST1, one cycle of execution of the control routine is terminated. When an affirmative determination is made at step ST1, step ST2 corresponding to control function of the slippage determination portion 80 is implemented to determine whether the second-order derivative ΔΔγ of the gear ratio γ is the second threshold value α2 or more. When a negative determination is made at step ST2, one cycle of execution of the control routine is terminated. When an affirmative determination is made at step ST2, step ST3 corresponding to control function of the slippage determination portion 80 is implemented to set the provisional flag of the occurrence of the micro slippage, to ON. Then, at step ST4, the gear ratio γ at a point of time at which the provisional flag is set to ON, is stored as a gear ratio γhd at a point of time at which the micro slippage is started. Step ST4 is followed by step ST5 corresponding to control function of the heat-quantity determination portion 82, which is implemented to calculate the heat quantity Qdot and then to determine whether the heat quantity Qdot is the third threshold value α3 or more. When a negative determination is made at step ST5, one cycle of execution of the control routine is terminated. When an affirmative determination is made at step ST5, step ST6 corresponding to control function of the storage portion 88 is implemented to store the maximum value (peak value) of the heat quantity Qdot.

Then, at step ST7 corresponding to control function of the continuation-time determination portion 84, it is determined whether the continuation time tcon from the point of time at which the provisional flag is set to ON is the fourth threshold value α4 or less. When a negative determination is made at step ST7, one cycle of execution of the control routine is terminated. When an affirmative determination is made at step ST7, step ST8 corresponding to control function of the slippage determination portion 80 is implemented to set the definitive flag of the occurrence of the micro slippage of the transmission belt 40, to ON, and to add one to the number N1 of times of occurrence of the micro slippage. Then, at step ST9 corresponding to control function of the storage portion 88, the time (year, month, day, hour, minute, second) of occurrence of the micro slippage is stored. Then, at step ST10 corresponding to control function of the storage portion 88, the command pressure value Pintgt and the actual pressure value Pin of the hydraulic actuator 34c of the primary pulley 34 upon occurrence of the micro slippage, and the difference ΔPin between the command pressure value Pintgt and the actual pressure value Pin are stored in the storage portion 88. Further, at step ST10, the command pressure value Pouttgt and the actual pressure value Pout of the hydraulic actuator 38c of the secondary pulley 38 upon occurrence of the micro slippage, and the difference ΔPout between the command pressure value Pouttgt and the actual pressure value Pout are stored in the storage portion 88. Still further, at step ST10, other data such as the running distance L of the vehicle 10, the number N1 of times of occurrence of the micro slippage and the input torque Tin are also stored in the storage portion 88.

Then, step ST11 corresponding to control function of the slippage-number measure portion 86 is implemented to determine whether the number N1 of times of occurrence of the micro slippage is one or not. When an affirmative determination is made at step ST11, the time stored at step ST9 is stored as the time of a first occurrence of the micro slippage at step ST12 corresponding to control function of the storage portion 88. When a negative determination is made at step ST11, the time stored at step ST9 is stored as the time of a latest occurrence of the micro slippage at step ST13 corresponding to control function of the storage portion 88.

Step ST12 or step ST13 is followed by step ST14 corresponding to control function of the hydraulic-vibration measure portion 90, which is implemented to determine whether the hydraulic-vibration occurrence flag is ON or not, namely, to determine whether the hydraulic vibration of the secondary pressure Pout has occurred upon occurrence of the micro slippage. When an affirmative determination is made at step ST14, step ST15 corresponding to control function of the hydraulic-vibration measure portion 90 is implemented to add one to the number N2 of times of occurrence of the hydraulic vibration. When a negative determination is made at step ST14, step ST16 corresponding to control function of the response-delay measure portion 92 is implemented to determine whether the above-described pressure-response-delay occurrence flag is ON or not, namely, to determine whether the response delay of the secondary pressure Pout has occurred upon occurrence of the micro slippage. When a negative determination is made at step ST16, the control flow goes to step ST18. When an affirmative determination is made at step ST16, step ST17 corresponding to control function of the response-delay measure portion 92 is implemented to add one to the number N3 of times of occurrence of the response delay. At step ST18 corresponding to control function of the storage portion 88, the various data stored in the storage portion 88 upon occurrence of the micro slippage are transmitted to the server 210.

Figure 5:
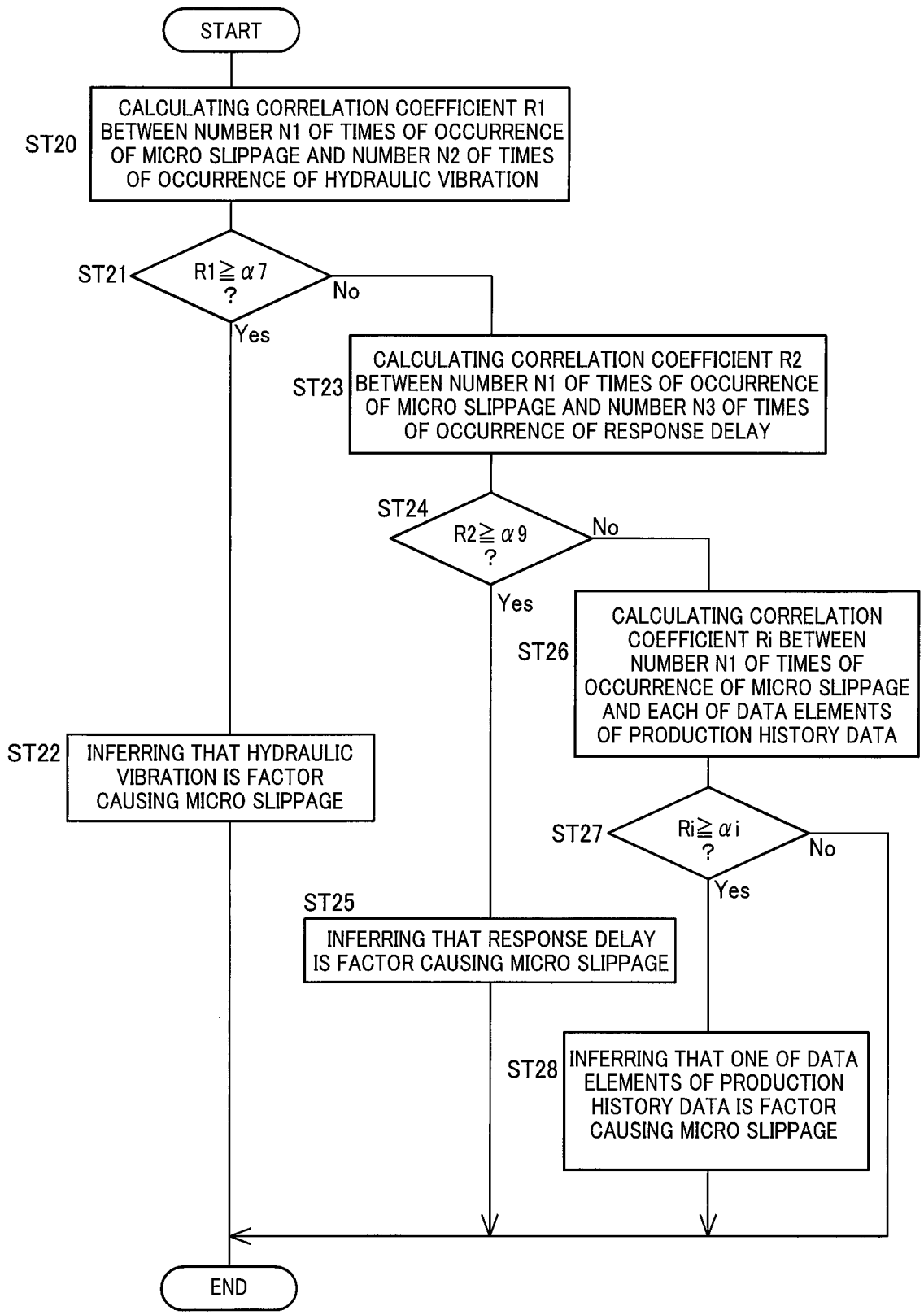
FIG. 5 is a flow chart for explaining control functions of a server shown in FIG. 1, and for explaining a control routine executed by the server, so as to infer a factor causing the micro slippage, based on the various data transmitted from the vehicles.

FIG. 5 is a flow chart for explaining control functions of the server 210, and for explaining a control routine executed by the server, so as to infer the factor causing the micro slippage, based on the various data transmitted from the vehicles. This control routine is executed, for example, each time when new data are transmitted to the server 210 in connection with occurrence of the micro slippage in each of the vehicles. It is noted that any one of steps ST20 through ST28 of the control routine shown in FIG. 5 corresponds to control function of the correlation inference portion 212.

The control routine shown in FIG. 5 is initiated with step ST20 that is implemented to calculate the correlation coefficient R1 between the number N1 of times of occurrence of the micro slippage and the number N2 of times of occurrence of the hydraulic vibration. Then, step ST21 is implemented to determine whether the correlation coefficient R1 is the seventh threshold value $\alpha 7$ or more. When an affirmative determination is made at step ST21, step ST22 is implemented to infer that the hydraulic vibration is the factor causing the micro slippage. When a negative determination is made at step ST21, step ST23 is implemented to calculate the correlation coefficient R2 between the number N1 of times of occurrence of the micro slippage and the number N3 of times of occurrence of the response delay. Step ST24 is followed by step ST24 that is implemented to determine whether the correlation coefficient R2 is the ninth threshold value $\alpha 9$ or more. When an affirmative determination is made at step ST24, step ST25 is implemented to infer that the response delay of the hydraulic pressure is the factor causing the micro slippage. When a negative determination is made at step ST24, step ST26 is implemented to calculate the correlation coefficient Ri between the number N1 of times of occurrence of the micro slippage and each data element of the production history data. Then, step S27 is implemented to determine whether the correlation coefficient Ri is the threshold value $\alpha i$ that is set for the corresponding data element, or more. When an affirmative determination is made at step ST27, step ST28 is implemented to determine that the correlation is present between the micro slippage and the data element, namely, that the data element (that is determined to have the correlation with the micro slippage) is the factor causing the micro slippage.

Thus, with the factor causing the micro slippage being inferred, it is possible to take countermeasures against the inferred factor causing the micro slippage. When it is inferred that the hydraulic vibration is the factor causing the micro slippage, for example, it is possible to take countermeasures such as (i) design change for changing a resonance frequency of a resonant structure of the hydraulic control unit 70 and (ii) change of dimensions of orifices provided in the hydraulic control unit 70. Further, it is possible to take other countermeasures such as (iii) reduction of a rate of change of the command pressure value of each of at least one hydraulic actuator provided in the hydraulic control unit 70 and (iv) increase of the command pressure value. When it is inferred that the response delay of the hydraulic pressure is the factor causing the micro slippage, it is possible to take countermeasures such as (v) increase of a rate of discharge of the working fluid from the oil pump and (vi) change of shape of a strainer. Further, it is possible to take a countermeasure such as (vii) advance of timing of output the command pressure value for each of at least one hydraulic actuator provided in the hydraulic control unit 70. With these countermeasures being taken, the occurrence of the micro slippage can be suppressed whereby the durability of the transmission belt 40 can be improved.

As described above, in the present embodiment, the factor causing the micro slippage of the transmission belt 40 is inferred, based on the secondary pressure Pout that is the hydraulic pressure of the working fluid supplied to the hydraulic actuator 38c of the secondary pulley 38, upon the occurrence of the micro slippage of the transmission belt 40. It is therefore possible to take countermeasures against the inferred factor causing the micro slippage, namely, take suitable countermeasures by taking account of the inferred factor causing the micro slippage, whereby the occurrence of the micro slippage can be suppressed and the reduction of durability of the transmission belt 40 can be suppressed.

In the present embodiment, it is possible to infer whether the hydraulic vibration is the factor causing the micro slippage, based on the correlation coefficient R1 between the number N1 of times of the occurrence of the micro slippage and the number N2 of times of the occurrence of the hydraulic vibration. Further, it is possible to infer whether the response delay of the hydraulic pressure is the factor causing the micro slippage, based on the correlation coefficient R2 between the number N1 of times of the occurrence of the micro slippage and the number N3 of times of the occurrence of the response delay of the hydraulic pressure.

There will be described another embodiment of this invention. The same reference signs as used in the above-described first embodiment will be used in the following second embodiment, to identify the functionally corresponding elements, and descriptions thereof are not provided.

Second Embodiment

In the above-described first embodiment, based on the various data transmitted to the server 210 from each of the vehicles, the factor causing the micro slippage is inferred for all of the vehicles. In this second embodiment, the factor causing the micro slippage is inferred in each of the vehicles.

Figure 6:
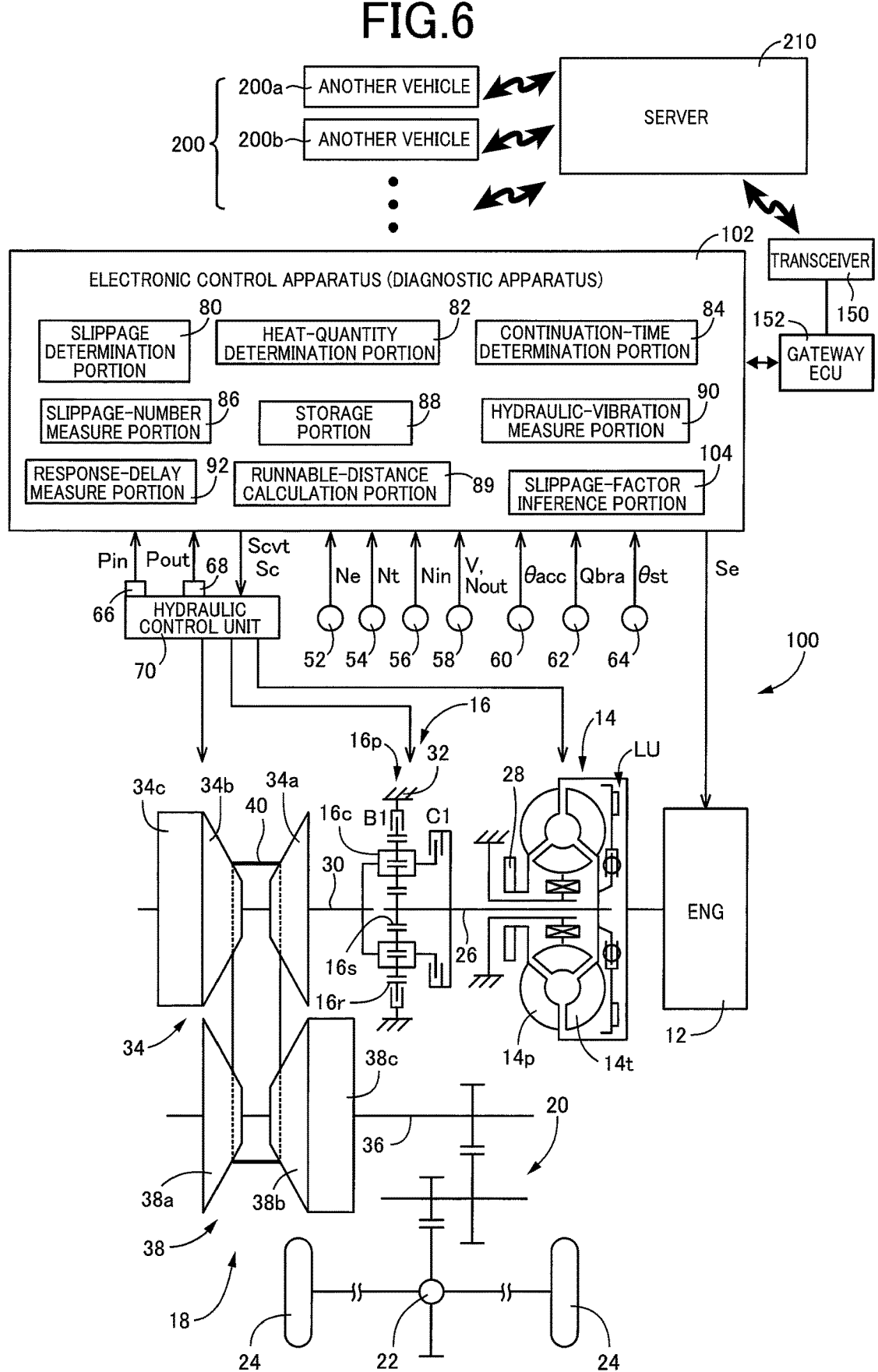
FIG. 6 is a schematic view showing a construction of a vehicle according to another embodiment of the present invention, and showing also major portions of control functions and control systems that are provided to perform various control operations in the vehicle.

FIG. 6 is a schematic view showing a construction of a vehicle 100 according to this second embodiment of the present invention, and showing also major portions of control functions and control systems that are provided to perform various control operations in the vehicle 100. The vehicle 100 is substantially the same in basic construction as the vehicle 10 in the above-described first embodiment. However, an electronic control apparatus 102 provided in the vehicle 100 functionally includes a slippage-factor inference portion 104 serving as a slippage-factor inference means for inferring the factor causing the micro slippage. Hereinafter, control functions of the slippage-factor inference portion 104 will be described. It is noted that the electronic control apparatus 102 and the slippage-factor inference portion 104 correspond to "diagnostic apparatus" and "inference portion" recited in the appended claims.

The slippage-factor inference portion 104 infers factor causing the micro slippage, based on the actual pressure value Pout (secondary pressure Pout) that is the hydraulic pressure of the working fluid supplied to the hydraulic actuator 38c of the secondary pulley 38. Specifically, the slippage-factor inference portion 104 infers the factor causing the micro slippage, based on the number N2 of times of occurrence of the hydraulic vibration of the actual pressure value Pout upon occurrence of the micro slippage and the number N3 of times of occurrence of the response delay of the actual pressure value Pout upon occurrence of the micro slippage. Then, the slippage-factor inference portion 104 calculates a ratio RT1 ($=N2/N1$) of the number N2 of times of occurrence of the hydraulic vibration to the number N1 of times of occurrence of the micro slippage, and determines whether the calculated ratio RT1 is at least a tenth threshold value α10. The tenth threshold value α10 is a predetermined value that is obtained by experimentation or determined by an appropriate design theory, such that the tenth threshold value α10 is set to a value of the ratio RT1, based on which the inference as to whether or not the hydraulic vibration is the factor causing the micro slippage can be made. Thus, the slippage-factor inference portion 104 infers that the hydraulic vibration is the factor causing the micro slippage when the ratio RT1 is the tenth threshold value α11) or more.

Further, the slippage-factor inference portion 104 calculates a ratio RT2 N3/N1) of the number N3 of times of occurrence of the response delay to the number N1 of times of occurrence of the micro slippage, and determines whether the calculated ratio RT2 is at least an eleventh threshold value α11. The eleventh threshold value α11 is a predetermined value that is obtained by experimentation or determined by an appropriate design theory, such that the eleventh threshold value α11 is set to a value of the ratio RT2, based on which the inference as to whether or not the response delay of the hydraulic pressure is the factor causing the micro slippage can be made. Thus, the slippage-factor inference portion 104 infers that the response delay of the hydraulic pressure is the factor causing the micro slippage when the ratio RT2 is the eleventh threshold value α11 or more.

Further, the slippage-factor inference portion 104 infers that another factor (that is other than the hydraulic vibration and the response delay of the hydraulic pressure) is the factor causing the micro slippage, when the ratio RT1 is smaller than the tenth threshold value α10 and the ratio RT2 is smaller than the eleventh threshold value all.

Figure 7:
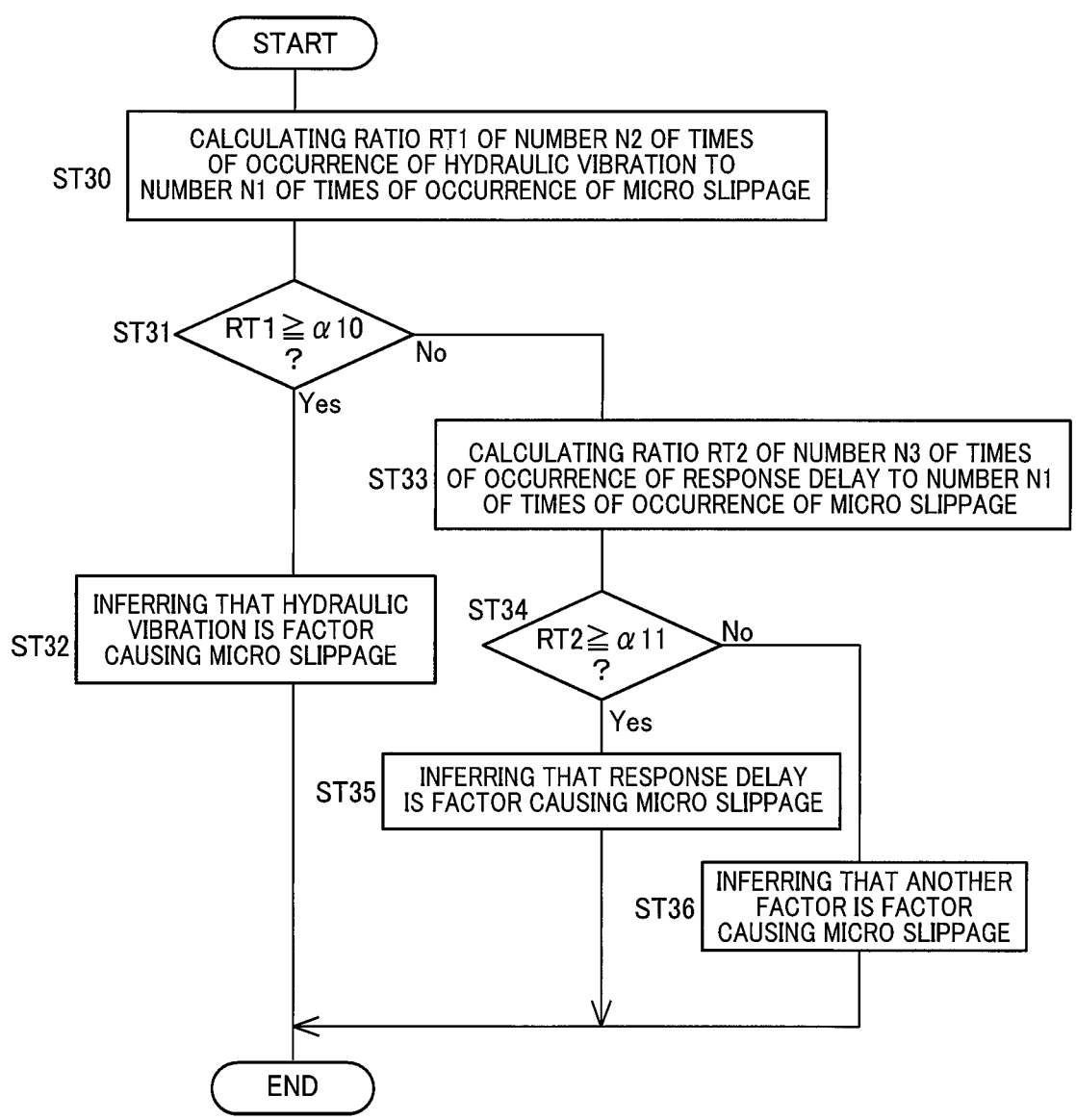
FIG. 7 is a flow chart for explaining a major portion of a control operation of an electronic control apparatus shown in FIG. 6, and, particularly, for explaining a control routine executed by the electronic control apparatus, so as to infer a factor causing the micro slippage.

FIG. 7 is a flow chart for explaining a major portion of a control operation of the electronic control apparatus 102, and, particularly, for explaining a control routine executed by the electronic control apparatus 102, so as to infer the factor causing the micro slippage. This control routine is executed, for example, each time when the occurrence of the micro slippage is determined. It is noted that any one of steps ST30 through ST36 of the control routine shown in FIG. 7 corresponds to control function of the slippage-factor inference portion 104.

This control routine of FIG. 7 is initiated with step ST30 that is implemented to calculate the ratio RT1 of the number N2 of times of occurrence of the hydraulic vibration to the number N1 of times of occurrence of the micro slippage. Then, step ST 31 is implemented to determine whether the calculated ratio RT1 is the tenth threshold value α10 or more. When an affirmative determination is made at step ST31, step ST32 is implemented to infer that the hydraulic vibration is the factor causing the micro slippage. When a negative determination is made at step ST31, step ST33 is implemented to calculate the ratio RT2 of the number N3 of times of occurrence of the response delay to the number N1 of times of occurrence of the micro slippage. Step ST33 is followed by step ST34 that is implemented to determine whether the calculated ratio RT2 is the eleventh threshold value α11 or more. When an affirmative determination is made at step ST34, step ST35 is implemented to infer that the response delay of the hydraulic pressure is the factor causing the micro slippage. When a negative determination is made at step ST34, step ST36 is implemented to infer another factor (that is other than the hydraulic vibration and the response delay of the hydraulic pressure) is the factor causing the micro slippage.

As described above, the factor causing the micro slippage can be inferred in the vehicle 100, by calculating the ratio RT1 of the number N2 of times of occurrence of the hydraulic vibration to the number N1 of times of occurrence of the micro slippage and the ratio RT2 of the number N3 of times of occurrence of the response delay of the hydraulic pressure to the number N1 of times of occurrence of the micro slippage. Thus, also in the present second embodiment, the factor causing the micro slippage can be inferred as in the above-described first embodiment. Further, based on the ratio RT1 of the number N2 of times of occurrence of the hydraulic vibration to the number N1 of times of occurrence of the micro slippage, it is possible to infer whether the hydraulic vibration is the factor causing the micro slippage in each vehicle. Similarly, based on the ratio RT2 of the number N3 of times of occurrence of the response delay of the hydraulic pressure to the number N1 of times of occurrence of the micro slippage, it is possible to infer whether the response delay of the hydraulic pressure is the factor causing the micro slippage in each vehicle.

While the preferred embodiments of this invention have been described in detail by reference to the drawings, it is to be understood that the invention may be otherwise embodied.

For example, in the above-described embodiments, it is determined whether the hydraulic vibration has occurred or not in the secondary pressure Pout (actual pressure value Pout) that is the hydraulic pressure of the hydraulic actuator 38c of the secondary pulley 38, and the factor causing the micro slippage is inferred based on the number N2 of times of occurrence of the hydraulic vibration in the secondary pressure Pout. However, the factor causing the micro slippage may be inferred also based on the hydraulic vibration in the primary pressure Pin that is the hydraulic pressure of the working fluid supplied to the hydraulic actuator 34c of the primary pulley 34. Further, it is also possible to determine whether the hydraulic vibration has occurred or not, both in the primary pressure Pin of the hydraulic actuator 34c of the primary pulley 34 and the secondary pressure Pout of the hydraulic actuator 38c of the secondary pulley 38.

In the above-described embodiments, it is determined whether the response delay has occurred or not in the secondary pressure Pout (actual pressure value Pout) that is the hydraulic pressure of the hydraulic actuator 38c of the secondary pulley 38, and the factor causing the micro slippage is inferred based on the number N3 of times of occurrence of the response delay in the secondary pressure Pout. However, the factor causing the micro slippage may be inferred also based on the response delay in the primary pressure Pin that is the hydraulic pressure of the working fluid supplied to the hydraulic actuator 34c of the primary pulley 34. Further, it is also possible to determine whether the response delay of the hydraulic pressure has occurred or not, both in the primary pressure Pin of the hydraulic actuator 34c of the primary pulley 34 and the secondary pressure Pout of the hydraulic actuator 38c of the secondary pulley 38.

In the above-described embodiments, the heat quantity Qdot in the secondary pulley 38 is calculated with an assumption that the heat quantity Qdot in the secondary pulley 38 is larger than the heat quantity Qdot in the primary pulley 34. However, in a case in which the heat quantity Qdot in the primary pulley 34 is larger, the heat quantity Qdot in the primary pulley 34 may be calculated. Further, it is also possible to calculate both of the heat quantity Qdot in the primary pulley 34 and the heat quantity Qdot in the secondary pulley 38 and to use a larger one of the calculated heat quantities Qdot.

In the above-described second embodiment, it is inferred whether the hydraulic vibration or the response delay of the hydraulic pressure is the factor causing the micro slippage, based on the ratio RT1 of the number N2 of times of occurrence of the hydraulic vibration to the number N1 of times of occurrence of the micro slippage and the ratio RT2 of the number N3 of times of occurrence of the response delay to the number N1 of times of occurrence of the micro slippage. However, this inference method does not necessarily provide a high degree of reliability of the reference if the number N1 of times of occurrence of the micro slippage is small. Therefore, the control routine shown in FIG. 7 may be executed when the number N1 of times of occurrence of the micro slippage has been increased to a predetermined number of times.

In the above-described embodiments, the macro slippage that continues for a relatively large length of time is treated as a phenomenon that is to be distinguished from the micro slippage. However, the micro slippage may be treated as the same slippage as the micro slippage. In this case, the micro slippage as well as the micro slippage corresponds to "slippage" that is recited in the appended claims.

In the above-described embodiments, the transmission belt 40 is constituted by the compression-type endless annular transmission belt that includes the endless annular hoop and the multiplicity of thick-plate-shaped block elements that are held by the endless annular hoop so as to be arranged in their thickness direction corresponding to the circumferential direction of the transmission belt 40, along the endless annular hoop. However, the "belt" recited in the appended claims does not necessarily have to be the transmission belt 40 constructed as described above, but may be, for example, a chain belt constituted by an endless annular link chain including a plurality of link plates alternately superposed and mutually connected at their end portions through connecting pins. Further, the "belt" recited in the appended claims may be a rubber belt.

In the above-described embodiments, the storage portion 88 is configured to store thein various data elements such as the time of the occurrence of the micro slippage, the heat quantity Qdot (peak value) upon the occurrence of the micro slippage, the command pressure value Pintgt and the actual pressure value Pin of the hydraulic actuator 34c of the primary pulley 34 upon the occurrence of the micro slippage, the command pressure value Pouttgt and the actual pressure value Pout of the hydraulic actuator 38c of the secondary pulley 38 upon the occurrence of the micro slippage, and the input torque Tin that is the value of the torque inputted to the continuously-variable transmission 18 upon the occurrence of the micro slippage. However, the storage portion 88 does not necessarily have to be configured to store thein all of these data elements, as long as the storage portion 88 stores therein at least one of these data elements.

It is to be understood that the embodiments described above are given for illustrative purpose only, and that the present invention may be embodied with various modifications and improvements which may occur to those skilled in the art.

NOMENCLATURE OF ELEMENTS

10; 100: vehicle
18: belt-type continuously-variable transmission
34: primary pulley
34c: hydraulic actuator of primary pulley
38: secondary pulley
38c: hydraulic actuator of secondary pulley
40: transmission belt (belt)
50; 102: electronic control apparatus (diagnostic apparatus for vehicle)
86: slippage-number measure portion
90: hydraulic-vibration measure portion
92: response-delay measure portion
104: slippage-factor inference portion (inference portion)
210: server (diagnostic apparatus for vehicle)
212: correlation inference portion (inference portion)
N1: number of times of occurrence of micro slippage (number of times of the occurrence of slippage of belt)
N2: number of times of occurrence of hydraulic vibration
N3: number of times of occurrence of response delay
R1: correlation coefficient between number of times of occurrence of micro slippage (slippage of belt) and number of times of occurrence of hydraulic vibration
R2: correlation coefficient between number of times of occurrence of micro slippage (slippage of belt) and number of times of occurrence of response delay of hydraulic pressure
RT1: ratio of number of times of occurrence of hydraulic vibration to number of times of occurrence of micro slippage (slippage of belt)
RT2: ratio of number of times of occurrence of response delay of the hydraulic pressure to number of times of occurrence of micro slippage (slippage of belt)
$\alpha 7$, $\alpha 9$, $\alpha 10$, $\alpha 11$: threshold value

What is claimed is:

1. A diagnostic apparatus for a vehicle that is provided with a continuously-variable transmission,
   wherein the continuously-variable transmission includes a primary pulley, a secondary pulley and a belt looped over the primary and secondary pulleys, such that each of the primary and secondary pulleys includes a hydraulic actuator to which a working fluid is to be supplied, and
   wherein the diagnostic apparatus comprises an inference portion that is configured, in event of occurrence of slippage of the belt on at least one of the primary and secondary pulleys, to infer a factor causing the slippage of the belt, based on at least one of a hydraulic pressure of the working fluid supplied to the hydraulic actuator of the primary pulley and a hydraulic pressure of the working fluid supplied to the hydraulic actuator of the secondary pulley, upon the occurrence of the slippage of the belt.

2. The diagnostic apparatus according to claim 1, comprising:
   a slippage-number measure portion configured to measure a number of times of the occurrence of the slippage of the belt; and
   a hydraulic-vibration measure portion configured to determine whether a hydraulic vibration of at least one of the hydraulic pressure of the working fluid supplied to the hydraulic actuator of the primary pulley and the hydraulic pressure of the working fluid supplied to the hydraulic actuator of the secondary pulley has occurred or not, upon the occurrence of the slippage of the belt, and configured to measure a number of times of occurrence of the hydraulic vibration,
   wherein the inference portion is configured to infer whether the hydraulic vibration is the factor causing the slippage of the belt, based on the number of times of the occurrence of the slippage of the belt and the number of times of the occurrence of the hydraulic vibration.

3. The diagnostic apparatus according to claim 1, comprising:
a slippage-number measure portion configured to measure a number of times of the occurrence of the slippage of the belt; and
a response-delay measure portion configured to determine whether a response delay of at least one of the hydraulic pressure of the working fluid supplied to the hydraulic actuator of the primary pulley and the hydraulic pressure of the working fluid supplied to the hydraulic actuator of the secondary pulley has occurred or not, upon the occurrence of the slippage of the belt, and configured to measure a number of times of occurrence of the response delay,
wherein the inference portion is configured to infer whether the response delay is the factor causing the slippage of the belt, based on the number of times of the occurrence of the slippage of the belt and the number of times of the occurrence of the response delay.

4. The diagnostic apparatus according to claim 2,
wherein the inference portion is configured to calculate a correlation coefficient between the number of times of the occurrence of the slippage of the belt and the number of times of the occurrence of the hydraulic vibration, and is configured to infer that the hydraulic vibration is the factor causing the slippage of the belt when the correlation coefficient is not smaller than a predetermined threshold value.

5. The diagnostic apparatus according to claim 3,
wherein the inference portion is configured to calculate a correlation coefficient between the number of times of the occurrence of the slippage of the belt and the number of times of the occurrence of the response delay, and is configured to infer that the response delay is the factor causing the slippage of the belt when the correlation coefficient is not smaller than a predetermined threshold value.

6. The diagnostic apparatus according to claim 2,
wherein the inference portion is configured to infer that the hydraulic vibration is the factor causing the slippage of the belt, when a ratio of the number of times of the occurrence of the hydraulic vibration to the number of times of the occurrence of the slippage of the belt is not smaller than a predetermined threshold value.

7. The diagnostic apparatus according to claim 3,
wherein the inference portion is configured to infer that the response delay is the factor causing the slippage of the belt, when a ratio of the number of times of the occurrence of the response delay to the number of times of the occurrence of the slippage of the belt is not smaller than a predetermined threshold value.

* * * * *